United States Patent [19]

Arnaud

[11] Patent Number: 5,541,543
[45] Date of Patent: Jul. 30, 1996

[54] REGULATING DEVICE FOR A TELEPHONE LOUD-SPEAKER

[75] Inventor: Thierry Arnaud, Meylan, France

[73] Assignee: SGS-Thomson Microelectronics S.A., Saint-Genis, France

[21] Appl. No.: 10,270

[22] Filed: Jan. 28, 1993

[30] Foreign Application Priority Data

Jan. 29, 1992 [FR] France ................... 92/01243

[51] Int. Cl.⁶ ..................... H03K 7/08; H03K 5/01
[52] U.S. Cl. ................. 327/175; 327/172; 327/178; 327/132; 327/131; 379/394; 379/398; 332/109
[58] Field of Search ...................... 307/265, 260, 307/261, 360; 379/374, 387, 375, 398, 400, 394, 401; 332/108, 109, 110

[56] References Cited

U.S. PATENT DOCUMENTS

| | | | |
|---|---|---|---|
| 4,152,670 | 5/1979 | Rimondini et al. | 379/400 |
| 4,220,826 | 9/1980 | Kiss | 179/51 AA |
| 4,489,222 | 12/1984 | Lusignan et al. | 177/120.2 |
| 4,513,178 | 4/1985 | Hing et al. | 379/387 |
| 4,580,064 | 4/1986 | Varnovitsky | 302/265 |
| 4,605,910 | 8/1986 | Covill | 332/109 |
| 4,620,312 | 10/1986 | Yamashita | 302/265 |
| 4,683,409 | 7/1987 | Boillat | 318/696 |
| 4,727,331 | 2/1988 | Hegeler | 328/59 |
| 5,045,800 | 9/1991 | Kung | 302/261 |
| 5,120,984 | 7/1992 | Klatser | 302/260 |
| 5,140,630 | 8/1992 | Fry et al. | 379/179 |
| 5,160,896 | 11/1992 | McKorkle | 330/251 |
| 5,220,203 | 6/1993 | McMorrow, Jr. et al. | 302/360 |
| 5,289,359 | 2/1994 | Ziermann | 379/324 |
| 5,420,777 | 5/1995 | Muto | 363/21 |

Primary Examiner—Timothy P. Callahan
Assistant Examiner—Dinh T. Le
Attorney, Agent, or Firm—David M. Driscoll; James H. Morris; Richard F. Giunta

[57] ABSTRACT

A fixed impedance load is provided with a signal having a variable frequency F from a line capable of supplying a variable available power. The device comprises a pulse width modulator that operates at frequency F and supplies the load with pulses, the width of which varies in the same way as the available power, so that the consumed power on the line remains lower than the available power.

34 Claims, 4 Drawing Sheets

REGULATING DEVICE FOR A TELEPHONE LOUD-SPEAKER

BACKGROUND OF THE INVENTION

1. Field of the Invention

The present invention relates to telephone sets fitted with a speech signal loud-speaker also serving as a ringer and more particularly to a device for regulating the power provided to the loud-speaker during a ring signal so that the sound power is at a maximum level as a function of the power available on the telephone line.

2. Discussion of the Related Art

Figure 1:
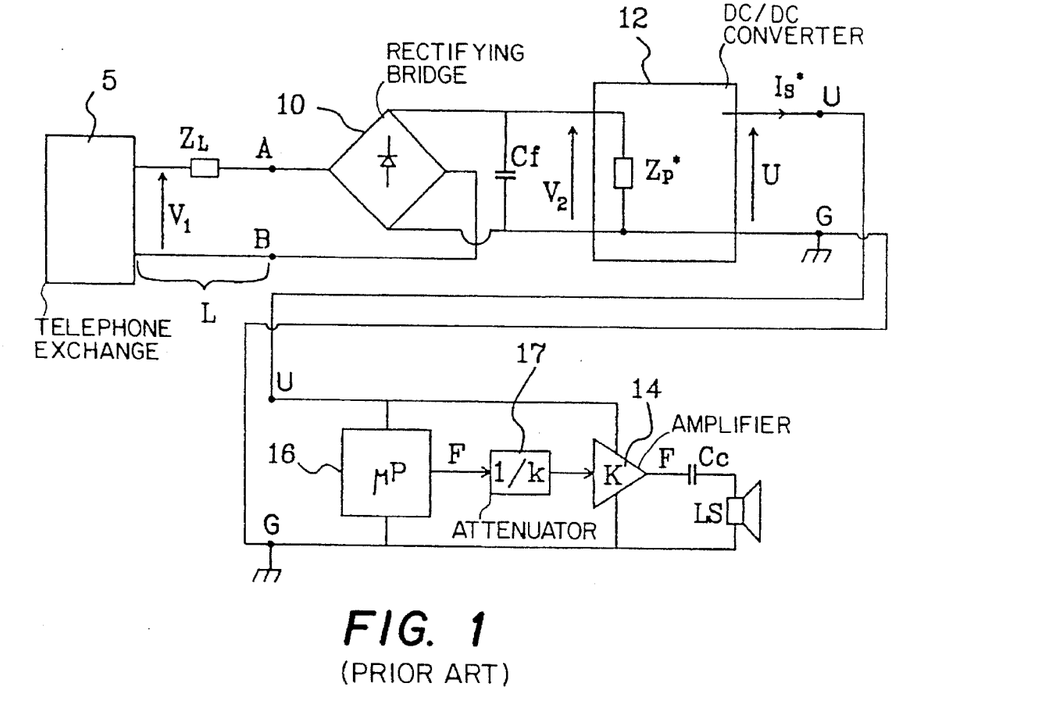
FIG. 1, above described, partially illustrates an architecture of a conventional telephone set.

FIG. 1 schematically shows some elements of a conventional telephone system. A telephone exchange 5 is connected to terminals A and B of a telephone set through a two-wire line L having an impedance $Z_L$. Terminals A and B are connected to the input of a rectifying bridge 10 which provides a voltage $V_2$. Voltage $V_2$ is filtered by a capacitor Cf and is applied to the input of a DC/DC converter 12 which provides at a terminal U a stabilized voltage U. The input and output of converter 12 have a common ground G. Voltage U, generally approximately 5 volts, is intended to supply various circuits of the telephone set and particularly the ringing circuit. At the input of converter 12 is shown an apparent impedance $Zp^*$ equal to the mean impedance of the ringing circuit, as seen from the input of converter 12.

The ringing circuit includes an amplifier 14 supplied by voltage U and powering a loud-speaker LS through a coupling capacitor Cc. Amplifier 14 has a gain K higher than 1 because it serves, outside ringing periods, to provide to loud-speaker LS a low-level speech signal, with a sufficiently high power.

A microprocessor 16 is also supplied by voltage U. When a ringing signal is detected on line L, microprocessor 16 provides a square wave signal F having its frequency modulated to generate a ringing melody to be reproduced by loud-speaker LS. The peak-to-peak amplitude of signal F is equal to U. In order not to saturate amplifier 14, signal F is divided by K in an attenuator 17 before it is applied to amplifier 14. Thus, at the output of amplifier 14, a signal practically equal to signal F is again provided. Due to the coupling capacitor Cc, the voltage across loud-speaker LS is a square wave voltage oscillating between values $-U/2$ and $U/2$. Under these conditions, the power provided to the loud-speaker is equal to a maximum value $P_M$.

The ringing signal provided by the telephone exchange 5 to the telephone line is assumed to be sufficient to supply the ringing circuit. The ringing signal is an a.c. voltage having an r.m.s. value $V_1$ variable about a nominal value (80 volts in France).

The higher the line impedance $Z_L$ (the longer the line L) and the lower value $V_1$, the smaller the available power to supply the ringing circuit. Assuming converter 12 is perfect, the power Pc consumed by the ringing circuit is equal to the power dissipated in impedance $Zp^*$. This consumed power can be rendered maximum by suitably selecting impedance $Zp^*$, that is, $Zp^*=Z_L$. This maximum power is defined as the available power Pd, expressed by:

$$Pd=V_1^2/4Z_L \qquad (1)$$

For the sake of simplification, it will be assumed that the circuits which consume all the power (Pc) are the loud-speaker and the amplifier.

Figure 2:
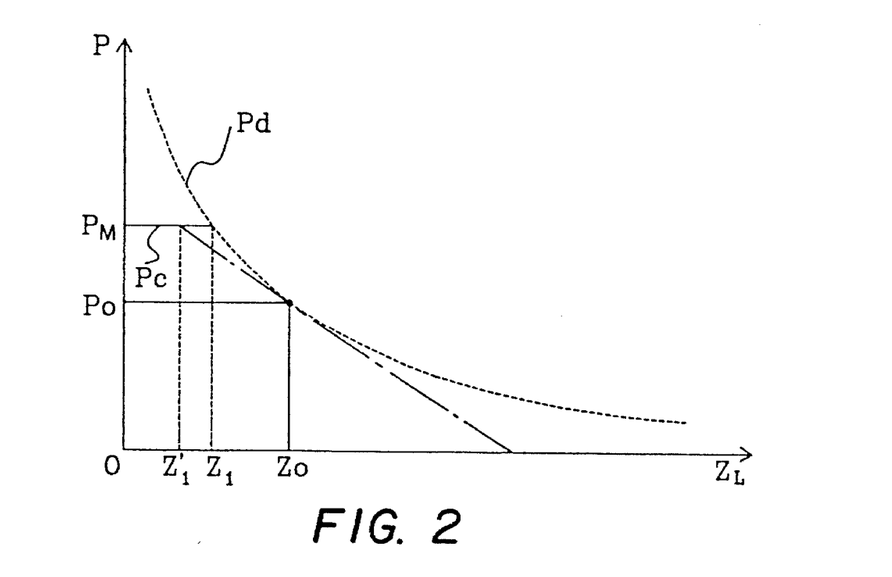
FIG. 2 shows variation curves of the power consumed and power available as a function of the line impedance.

FIG. 2 shows a curve in dashed lines of the variation of the available power Pd as a function of the line impedance $Z_L$. The solid line represents the consumed power Pc. The consumed power Pc is constant and equal to the maximum value $P_M$ for values of impedance $Z_L$ ranging from 0 to an impedance $Z_L$ where the available power Pd is equal to power $P_M$. Power Pc is constant within this range because the ringing circuit has a constant impedance supplied by a constant voltage U. When the line impedance $Z_L$ becomes higher than $Z_1$, the available power Pd becomes lower than the maximum power $P_M$ always needed by the ringing circuit. Then, converter 12 is no longer suitably supplied, its output voltage U drops and the ringing circuits misfunction or may no longer operate at all.

In the prior art, to avoid a drop of voltage U when impedance $Z_L$ becomes higher than $Z_1$, it has been proposed that amplifier 14 has a variable gain K. Gain K is regulated so as to decrease the power dissipated in the loudspeaker when the consumed power Pc approaches the available power Pd, so that the consumed power Pc remains lower than the available power Pd.

In practice, gain K is regulated proportionally to the input voltage $V_2$ that varies in the same way as the available power Pd. The ratio between gain K and voltage $V_2$ is adjusted so that the consumed power Pc is equal to the available power Pd under nominal conditions, i.e., when the line impedance $Z_L$ reaches a nominal value $Z_0$ (2000 Ω in France). The available power Pd under nominal conditions is referenced $P_0$. With this configuration, when impedance $Z_L$ varies about $Z_0$, the consumed power Pc linearly varies, as represented in dot and dash lines, tangentially to curve Pd at point ($Z_0,P_0$) and remains lower than the available power Pd. When the line impedance $Z_L$ reaches a value $Z1'$ lower than value $Z_1$, gain K reaches its nominal value where the peak-to-peak amplitude of the voltage across the loud-speaker is equal to value U of the supply voltage. At this moment, even if gain K further increases, the voltage provided to the loud-speaker can no longer increase and the consumed power remains equal to the maximum power $P_M$.

However, an amplifier, supplied with a voltage U and providing a rectangular voltage having an amplitude lower than U to a load has an efficiency lower than 1. The higher impedance $Z_L$ becomes with respect to $Z_1'$, the more the efficiency decreases, and the more amplifier 14 dissipates power to the detriment of the loud-speaker. Thus, for lines having impedance approaching the maximum tolerable value (3500 Ω in France), the power supplied to the loud-speaker may be insufficient although the consumed power Pc is not negligible because of power dissipation in the amplifier and not in the loud-speaker.

SUMMARY OF THE INVENTION

An object of the invention is to provide a power regulating device for a telephone ringer that provides sufficient power to a loud-speaker when the impedance of a telephone line is particularly high.

To achieve this object and others, the invention applies pulses having a constant amplitude equal to the supply voltage of the ringing circuit to a loud-speaker. The width of these pulses is modulated to vary the power consumed by the loud-speaker as a function of the power available on the telephone line.

Since pulses must occur at a variable frequency to produce a melody, an aspect of the invention is to provide a pulse width modulator providing pulses at variable frequencies.

The invention more particularly relates to a device for providing a load having a fixed impedance with a signal having a variable frequency F from a line capable of supplying an available power. The device comprises a pulse width modulator operating at a frequency F and supplying the load with pulses, the width of which varies in the same way as the available power.

According to an embodiment of the invention, the line is connected to the input of a dc-to-dc converter which provides a constant supply voltage to the load.

According to an embodiment of the invention, the pulse width modulator comprises: a generator providing a triangular signal having a frequency F and a constant amplitude; a window comparator indicating whether the amplitude of the triangular signal is included within the upper and lower limits determined by a control signal varying in the same direction as the available power; and a switch controlled by the window comparator, a terminal of the switch receiving the rectangular signal with frequency F, and the other terminal forming the output of the pulse width modulator.

According to an embodiment of the invention, the generator providing the triangular signal includes a charge current source and a discharge current source, alternatively connected, at frequency F, to a capacitor.

According to an embodiment of the invention, the common value of the charge and discharge currents is proportional to frequency F.

According to an embodiment of the invention, the charge and discharge current sources are switched by a microprocessor also providing a digital datum representative of frequency F. The digital datum is applied to a digital-to-analog converter providing a current which fixes the value of the charge and discharge currents.

According to an embodiment of the invention, the charge and discharge current sources include: a first current mirror copying and providing on two outputs the current supplied by the digital-to-analog converter, a first output being connected to a terminal of the capacitor; a doubling current mirror having an input connected to the second output of the first mirror and an output connected to the terminal of the capacitor; and a switch actuated at frequency F and shorting the input of the doubling mirror in order to eliminate the output current of the latter.

According to an embodiment of the invention, the control signal is a current proportional to a voltage available on the line. The current is forced to flow through first and second resistors, the voltages across the resistors respectively fixing the upper and lower limits of the window comparator so that, when the line impedance is equal to a nominal value, the power consumed on the line is equal to the power then available.

According to an embodiment of the invention, the frequency signal F corresponds to a telephone ringing melody, the load comprising an amplifier connected to a loud-speaker.

According to an embodiment of the invention, the line is a telephone line, the available voltage being established by a ringing signal carried on the telephone line.

The foregoing and other objects, features, aspects and advantages of the invention will become apparent from the following detailed description of the present invention which should be read in conjunction with the accompanying drawings.

BRIEF DESCRIPTION OF DRAWINGS

FIG. 5 shows an embodiment of a regulating device according to the invention;

DETAILED DESCRIPTION

Figure 3A:
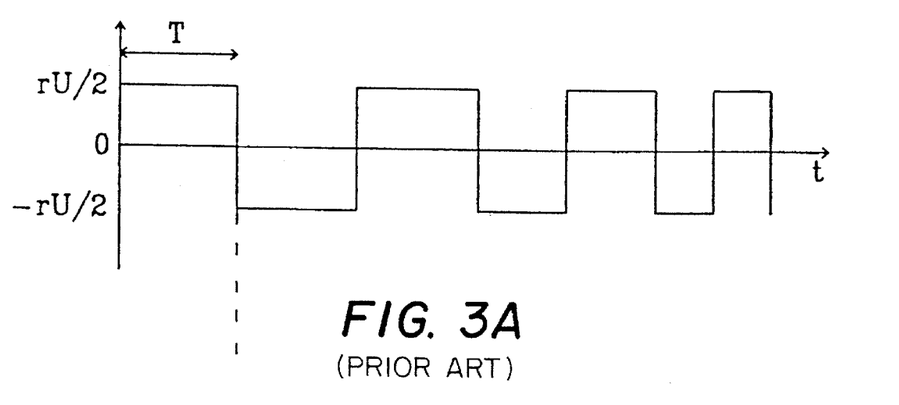
FIGS. 3A and 3B are variation curves of the voltage provided to a loud-speaker by a conventional power regulator and of the voltage provided by a regulator according to the invention, respectively.

As shown in FIG. 3A, if the line impedance is higher than impedance $Z_1'$ previously defined in relation with FIG. 2, a conventional regulator including a variable gain amplifier supplied by a voltage U, such as the amplifier of FIG. 1, provides to a loud-speaker LS a square signal having a half period T and extreme values $rU/2$ and $-rU/2$, where r is a coefficient lower than 1 which depends on the available voltage $V_2$. The signal is represented with a variable frequency to produce various sounds.

In this example, power P provided to the loud-speaker is equal to:

$$P = r^2 U^2 / 4 Z_{LS},$$

$Z_{LS}$ designating the loud-speaker impedance; whereas the consumed power Pc is equal to:

$$Pc = rU^2/4Z_{LS}$$

Thus, the power provided to the loud-speaker is equal to $P=rPc$, and is all the smaller with respect to the power dissipated in the amplifier as factor r (which varies in the same direction as the available power Pd) is small. When $r=1$, power P is equal to its maximum value $P_M$.

Figure 3B:
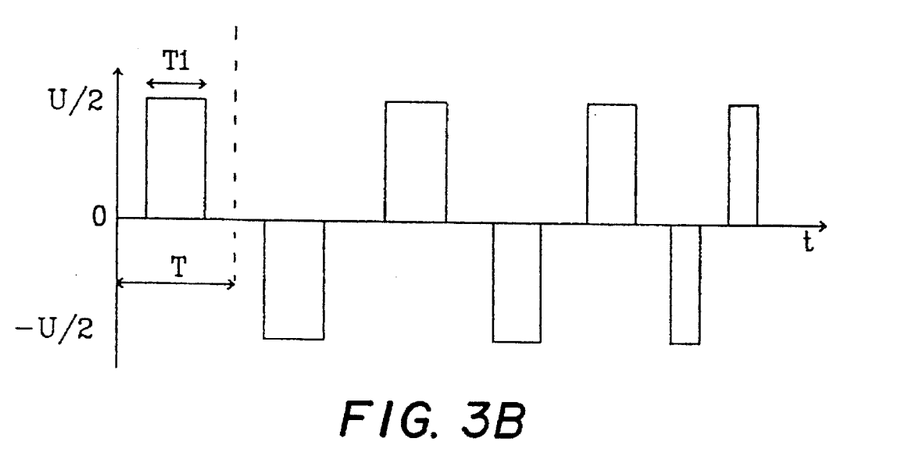

According to the invention, for control of the consumed power Pc, instead of modifying the amplitude of the voltage supplied to the loud-speaker, the half period duration of the voltage is modified. As shown in FIG. 3B, for a period of 2T, instead of two half periods having a duration T, half period portions of width $T_1$ are applied to the loud-speaker. This method allows the supplying of practically the whole consumed power (Pc) to the load (loud-speaker).

For a determined value of impedance $Z_L$, and therefore of the available power Pd, ratio $T_1/T$ is constant and preferably as close as possible to $Pd/P_M$. The mean power P provided to the loud-speaker is then equal to:

$$P = P_M T_1/T = Pd.$$

Thus, when the available power Pd is lower than the maximum power $P_M$, the power provided to the loud-speaker is equal to the available power. When the available power is higher than the maximum power $P_M$, time $T_1$ is equal to its maximum value T; the power provided to the loud-speaker is constant and equal to the maximum value $P_M$.

According to an aspect of the invention, leading to a particularly simple implementation, ratio $T_1/T$ is regulated as a function of voltage $V_2$ present at the input of converter 12, so as to have $Pc=Pd=P_0$ under nominal conditions. With this selection, when $Z_L$ varies about $Z_0$, the consumed power Pc, and therefore the power P supplied to the loud-speaker, varies tangentially to the curve Pd of FIG. 2 at point $(Z_0,P_0)$. Additionally, by varying $T_1/T$ as a function of $V_2$, variations of the available power Pd as a function of voltage $V_1$ provided by the telephone exchange are also taken into account.

Figure 4:
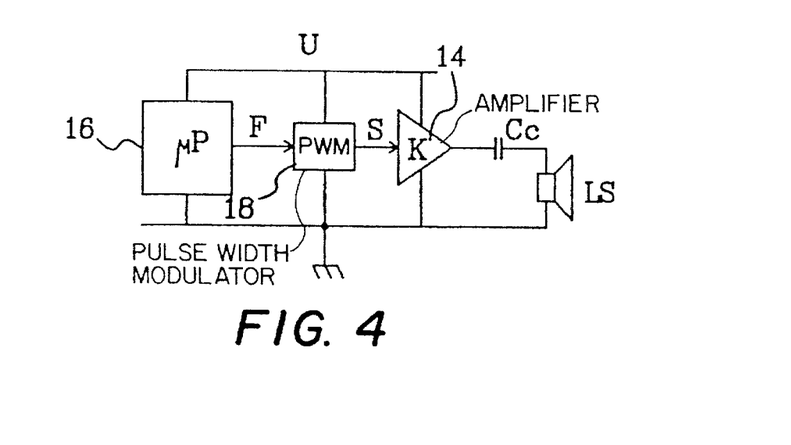
FIG. 4 is a block diagram of a telephone set architecture incorporating a power regulating device according to the invention.

FIG. 4 shows a regulating device 18, according to the invention, disposed between the microprocessor 16 and amplifier 14 of FIG. 1. Here, gain K of amplifier 14 is constant. Device 18 receives the square wave signal F from the microprocessor and provides a signal S, having the shape of the signal of FIG. 3B, to amplifier 14.

Device 18 is a pulse width modulator having the characteristic, according to the invention, of providing pulses at a variable frequency.

Figure 6:
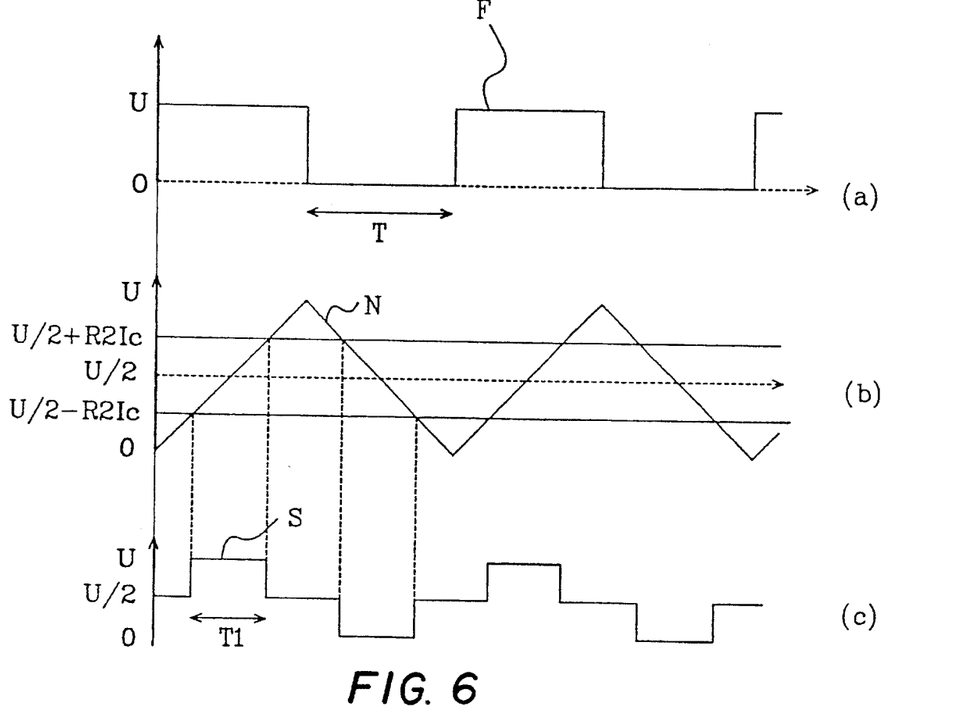
FIG. 6 shows signals at various nodes of the regulating device of FIG. 5.

FIG. 5 is a simplified diagram of an embodiment of such a pulse width modulator 18. In the description of FIG. 5, FIG. 6, which shows the shapes of the various signals appearing in modulator 18, will also be referred to.

A switch K1 is controlled by the square wave signal F provided by the microprocessor 16. Curve (a) of FIG. 6 shows the shape of signal F. Switch K1 alternatively switches a terminal N of a capacitor $C_1$ onto a charge current source 30 connected to voltage U and onto a discharge current source 31 connected to ground. The charge and discharge currents of capacitor $C_1$ have the same value I1 determined by a digital datum $D_F$ provided by microprocessor 16. The digital datum $D_F$ is proportional to the frequency of signal F, so that the value $I_1$ of the charge and discharge currents is also proportional to this frequency. The other terminal of capacitor $C_1$ is grounded.

With this configuration, one obtains on terminal N a triangular signal N at the frequency of signal F and a constant amplitude as shown by curve (b) of FIG. 6. The amplitude of the triangular signal N is determined by the ratio between value $I_1$ and the frequency of signal F, and by value $C_1$ so as to remain substantially constant. It is assumed for the sake of simplicity that the amplitude of the triangular signal remains equal to U.

The input of a two-output current mirror M1 connected to ground, is connected to voltage $V_2$ through a resistor $R_1$. The input current Ic of current mirror $M_1$ is therefore:

$$Ic=V_2-V_0/R_1 \qquad (2)$$

where $R_1$ is the value of resistor $R_1$ and $V_0$ is a determined reference voltage or a constant base-emitter voltage of a transistor present between the input of current mirror $M_1$ and ground.

As can be seen, current Ic is proportional to voltage $V_2$. Hereunder, it will be noted that ratio $T_1/T$ is proportional to current Ic. As above mentioned, this selection allows a particularly simple manufacturing of modulator 18. However, to further improve adjustment of the consumed power, ratio $T_1/T$ can also be regulated proportionally to a second degree polynomial of Ic, in order to obtain a ratio $T_1/T$ proportional to the available power Pd. Those skilled in the art can easily determine this polynomial and construct adequate circuits, for example by using a current multiplier, to obtain such a regulation of $T_1/T$.

A first output of current mirror M1 is connected to the input of a current mirror M2 connected to voltage U. The output of current mirror M2 is connected to the second output of current mirror M1 through two series resistors 35 and 36 having respective values R2. The voltage at the junction of resistors 35 and 36 is fixed to a reference value U/2. Terminal N is connected to the inverting input of a comparator A1 and to the non-inverting input of a comparator A2. The non-inverting input of comparator A1 is connected to the output of current mirror M2 and the inverting input of comparator A2 is connected to the output of the current mirror M1. The corresponding outputs S1 and S2 of comparators A1 and A2 are connected to an AND gate 38 which controls a device symbolically shown by a switch K2. This switch determines the transmission of signal F to the output S of the regulating device 18. Output S is connected to voltage U/2 through a resistor R3, which adjusts the output voltage S to U/2 when switch K2 is switched off.

Comparators A1 and A2 and AND gate 38 form a window comparator. The upper and lower limits of the window are fixed to U/2+R2Ic, and U/2–R2Ic, respectively, by current Ic flowing through resistors 35 and 36. The window is shown on diagram (b) of FIG. 6. When the amplitude of the triangular signal N falls within the window, the output of AND gate 38 is high. When the amplitude of the triangular signal is outside the window, the output of AND gate 38 is low. As shown by curve (c) of FIG. 6, the output voltage S reaches either of its extreme values U and 0, when the amplitude of the triangular signal N is within the window, and is equal to U/2 when the amplitude of signal N is outside the window. Voltage S is provided to the loud-speaker LS through amplifier 14 and capacitor Cc. The voltage across the loud-speaker then exhibits the characteristics shown in FIG. 3B.

A resistor (not shown), disposed in series with switch K2, can be provided to form with resistor R3 a dividing bridge having a ratio 1/K (K being the gain of amplifier 14). Thus, voltage S will have an amplitude U/K, which will avoid saturating amplifier 14 while providing an amplitude voltage U to the loud-speaker.

Value $T_1$ mentioned in relation with FIG. 3B corresponds to the duration of each occurrence of the triangular signal N in the window. This duration is:

$$T_1=2R_2Ic/U$$

which leads to:

$$T_1/T=2R_2Ic/U. \qquad (3)$$

Since current Ic is proportional to $V_2$ (formula (2)), it is deduced from the above formula (3) that the ratio $T_1/T$ is also proportional to $V_2$. Value $R_1$ (value $R_2$ being generally fixed) is chosen so that, under nominal conditions, the consumed power Pc is equal to the available power $Pd=P_0$. Then, a power regulation according to the curve Pd drawn in dotted line in FIG. 2 is obtained, the power being consumed in the loud-speaker with practically no loss in the associated amplifier which operates with a maximum output amplitude.

Figure 7:
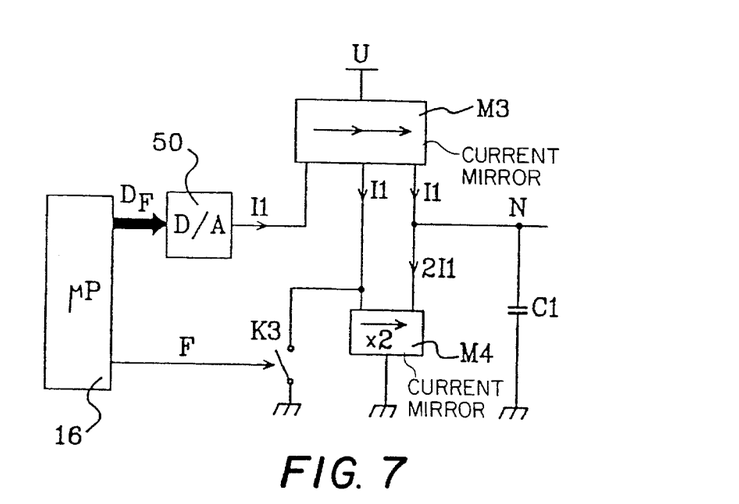
FIG. 7 illustrates in more detail an embodiment of an element of the regulating device of FIG. 5 capable of generating a triangular signal.

FIG. 7 illustrates an exemplary embodiment of current sources 30, 31 which are programmable by datum $D_F$ provided by microprocessor 16. Datum $D_F$ is provided to a digital-to-analog converter 50 which produces a current I1 at the input of a two-output current mirror M3, connected to voltage U. A first output of current mirror M3 is connected to the input of a doubling current mirror M4 connected to ground. The second output of mirror M3 is connected to the output of mirror M4 and to terminal N of capacitor $C_1$ shown in FIG. 3. A switch K3 is controlled by the square wave signal F provided by microprocessor 16 and shorts the input of mirror M4 to ground.

With this configuration, when switch K3 is switched on, mirror M4 is inhibited and only current I1 provided by the second output of mirror M3 charges capacitor $C_1$. When switch K3 is switched off, mirror M4 is active and draws a current equal to $2I_1$, which causes the discharge of capacitor $C_1$ by a current equal to $I_1$.

As is apparent to those skilled in the art, various modifications can be made to the above disclosed preferred embodiments, particularly for the fabrication of programmable current sources 30 and 31, and of the various switches. Additionally, other methods for obtaining a duration ratio $T_1/T$ associated to the power available on a line can be devised. For example, when it is desired that this ratio be proportional to $V_2$, it is possible to provide to microprocessor 16 signals representative of this parameter and to program microprocessor 16 so as to provide the desired square waves.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A device for supplying power to a load from a line supplying an input power that is limited and variable, comprising:

a circuit that generates a variable frequency signal; and a pulse width modulator having a first input coupled to the line, having a second input coupled to the circuit to receive the variable frequency signal and having an output coupled to the load to provide a pulse width modulated signal to the load, the pulse width modulator modulating a pulse width of the variable frequency signal to generate the pulse width modulated signal, the pulse width modulator varying a duty cycle of the pulse width modulated signal in response to variations in the input power.

2. The device of claim 1, further comprising a dc-dc converter coupled between the circuit and the line, to provide a constant supply voltage to the circuit.

3. The device of claim 1, wherein the pulse width modulator comprises:

a generator providing a triangular signal synchronized with the variable frequency signal and having a substantially constant amplitude;

a window comparator that generates a logic signal indicative of whether the triangular signal falls within upper and lower limits of the window comparator, said upper and lower limits being established by a control signal that is proportional to the input power; and a switch having a control terminal receiving the logic signal, an input terminal receiving the variable frequency signal, and an output terminal providing the pulse width modulated signal.

4. The device of claim 3, wherein the generator includes:

a charge current source that generates a charge current;

a discharge current source that generates a discharge current; and a capacitor, having a first terminal and a second terminal, the charge current source and the discharge current source being alternately coupled, at a rate synchronized to the variable frequency signal, to the first terminal of the capacitor, the second terminal of the capacitor being coupled to a fixed voltage.

5. The device of claim 4, further comprising means for establishing the charge and discharge currents in proportion to a frequency of the variable frequency signal, to keep an amplitude of the triangular signal substantially constant over a range of frequencies of the variable frequency signal.

6. The device of claim 5, wherein the circuit that generates the variable frequency signal comprises:

a microprocessor that controls the alternate coupling of the charge and discharge current sources to the first terminal of the capacitor; and a digital-to-analog converter;

wherein the microprocessor provides a digital datum, responsive to the variable frequency signal, to a digital input of the digital-to-analog converter, the digital-to-analog converter providing an output current that establishes a value of the charge and discharge currents.

7. The device of claim 6, wherein:

the charge current source comprises a first current mirror that receives the output current of the digital-to-analog converter and outputs first and second mirrored currents, the first mirrored current being the charge current; and the discharge current source comprises a second current mirror that receives the second mirrored current and output a third mirrored current, the third mirrored current combining with the charge current at the first terminal of the capacitor to yield the discharge current, the discharge current being equal to a difference between the third mirrored current and the charge current; and the device further includes a switch, actuated at the variable frequency, that has a position wherein it disables the second current mirror to make the third mirrored current substantially zero.

8. The device of claim 3, wherein the control signal is a control current proportional to a voltage available on the line, the control current being directed to flow through a biasing impedance to generate high and low threshold voltages, respectively forming the upper and lower limits of the window comparator, the high and low threshold voltages varying with the control current so that, when an impedance of the line is substantially equal to a nominal value, a power consumed on the line is substantially equal to the available power.

9. The device as in one of claims 1 to 8 in combination with the line and the load, wherein the line is a telephone line, the load includes a loudspeaker and an amplifier coupled to the loudspeaker, and the variable frequency signal determines a telephone ringing melody in the loudspeaker.

10. The combination of claim 9, wherein the device further includes a rectifier that converts a ringing signal carried on the telephone line into a voltage whose value is indicative of the variable power.

11. A device for supplying power to a load from a line supplying an input power that is limited and variable, the device comprising:

means for generating a variable frequency signal; and pulse width modulating means, coupled to the line and between the means for generating and the load, for pulse width modulating the variable frequency signal to generate a pulse width modulated signal that provides power to the load;

wherein the pulse width modulating means further includes means for varying a duty cycle of the pulse width modulated signal so that the duty cycle respectively increases and decreases as the input power increases and decreases.

12. The device of claim 11, further comprising:

means for converting the variable power into a constant supply voltage and for providing the constant supply voltage to the means for generating.

13. The device of claim 11, wherein the means for pulse width modulating comprises:

means for generating a triangular signal having a frequency equal to that of the variable frequency signal and maintaining a substantially constant amplitude;

means for indicating whether the triangular signal falls within upper and lower signal limits; and means, responsive to the means for indicating, for respectively coupling and uncoupling the variable frequency signal to and from the load.

14. The device of claim 13, wherein the means for generating the triangular signal includes:

means for generating a charge current;

means for generating a discharge current;

a capacitor having first and second terminals, the second terminal being coupled to a fixed voltage; and means for switching the charge current and the discharge current to the first terminal of the capacitor, at a frequency equal to that of the variable frequency signal.

15. The device of claim 14, further comprising means for maintaining a constant amplitude of the triangular signal, including means for establishing the charge and discharge currents in proportion to a frequency of the variable frequency signal.

16. The device of claim 15, wherein the means for maintaining further comprises:

means for generating a digital datum whose value varies in response to the frequency of the variable frequency signal;

means for converting the digital datum into an analog output current; and means for replicating the analog output current to generate the charge and discharge currents.

17. The device of china 16, wherein the means for replicating the analog output current to generate the charge and discharge currents includes:

means for replicating the analog output current to generate first and second mirrored currents; and means for replicating the second mirrored current to generate a third mirrored current, the first and third mirrored currents both being coupled to the first terminal of the capacitor;

wherein the means for switching the charge and discharge currents includes means for disabling the second current mirror so that the third mirrored current is made substantially zero.

18. The device of claim 13, wherein the means for indicating further comprises:

means for generating a control current proportional to the input power; and means for directing the control current to flow through a biasing impedance to generate high and low threshold voltages forming the upper and lower limits of the means for indicating, the high and low threshold voltages varying with the control current so that, when an impedance of the line is substantially equal to a nominal value, a power consumed on the line is substantially equal to the available power.

19. The device as in one of claims 11–18 in combination with the line and the load, wherein the line is a telephone line and the variable frequency signal encodes a telephone ringing melody, and wherein the load comprises an amplifier coupled to a loudspeaker.

20. The combination of claim 19, wherein the device further includes means for rectifying a ringing signal carried on the telephone line to generate a supply voltage indicative of the input power.

21. A method for supplying a modulated signal to a load, the modulated signal being derived from a power source having variable available power, comprising the steps of:

detecting variations in the available power;

when a variation in available power is detected, varying a duty cycle of the modulated signal by pulse width modulating a variable frequency signal such that the duty cycle respectively increases and decreases as the available power increases and decreases; and supplying the modulated signal to the load.

22. The method of claim 21, wherein the step of modulating includes the steps of:

generating a triangular signal having a frequency synchronized to that of the variable frequency signal signal and having a constant amplitude;

window comparing the triangular signal with upper and lower limits determined by a control signal that varies as the available power varies, to indicate whether the triangular signal falls within the upper and lower limits; and a switch having a control terminal that receives the control signal, an input terminal that receives the drive signal, and an output terminal that supplies an output signal to the load, the switch respectively coupling and uncoupling the input terminal to the output terminal in response to an assertion and a deassertion of the control signal;

wherein the pulse width modulator includes means for varying a duty cycle of the control signal in response to variations in the available power.

23. The method of claim 22, wherein the step of window comparing includes the step of establishing the upper and lower limits so that the variable available power substantially equals a power applied to the load.

24. A device for supplying a drive signal to a lead, the device being powered from a line providing an available power level that is variable and limited, the device comprising:

a circuit that generates a variable frequency signal;

a pulse width modulator that receives the variable frequency signal, is coupled to the line to receive a signal having a level that indicates the available power level, and generates a control signal having a frequency synchronized with that of the variable frequency signal and a pulse width proportional to the available power level, the pulse width modulator including a switch having a control terminal that receives the control signal, an input terminal that receives the variable frequency signal, and an output terminal that supplies the drive signal to the lead, the switch respectively coupling and uncoupling the input terminal to the output terminal in response to an assertion and a deassertion of the control signal to vary a duty cycle of the drive signal in response to variations in the available power.

25. The device of claim 24, wherein the pulse width modulator comprises:

a waveform generator that generates a repetitive signal having a frequency equal to that of the variable frequency signal;

a window comparator, coupled to the waveform generator and receiving high and low threshold voltages, that asserts the control signal when the repetitive signal is between the high and low threshold voltages; and means for adjusting the high and low threshold voltages of the window comparator.

26. The device of claim 25, wherein the means for adjusting the high and low threshold voltages of the window comparator comprises:

an impedance having high and low terminals, each coupled to the window comparator, respectively providing the high and low threshold voltages;

a current mirror, coupled to at least one of the high and low terminals of the impedance, inducing a flow of current through the impedance to generate a difference between the high and low threshold voltages;

means for providing a voltage signal indicative of a variable voltage on the line; and means for providing an input current to the current mirror, the input current respectively increasing and decreasing as the voltage signal increases and decreases.

27. The device of claim 26, wherein the means for providing the input current includes a resistor coupled between the current mirror and the voltage signal.

28. The device of claim 26, wherein the means for providing the input current includes a current multiplier that provides a current proportional to a second degree polynomial of the input current.

29. The device of claim 25, further comprising means, coupled to the waveform generator, for establishing an amplitude of the repetitive signal.

30. A method for supplying a modulated signal to a load, the modulated signal being provided from a power line having a variable available power level, comprising the steps of:

detecting the available power level; and adjusting a duty cycle of the modulated signal by pulse width modulating a variable frequency input signal such that the duty cycle respectively increases and decreases as the available power increases and decreases so that a power dissipated by the lead substantially equals the available power level.

31. The method of claim 30, further comprising the step of:

maintaining an amplitude of the modulated signal at a constant value despite variations in the variable available power.

32. The method of claim 30, wherein the step of adjusting includes adjusting the duty cycle in proportion to variations of a voltage of the power line.

33. The method of claim 31, wherein the step of adjusting the duty cycle includes selectively connecting and disconnecting the signal to and from the load.

34. A device for supplying a drive signal to a lead, the device being powered from a line providing an available power level that is variable and limited, the device comprising:

a circuit that generates the drive signal, the drive signal having a variable frequency; and a detecting control circuit, coupled to the circuit that generates the drive signal and coupled to said line, that detects the available power level and varies a duty cycle of the drive signal in response to variations in the available power.

* * * * *